United States Patent
Gotoh et al.

(10) Patent No.: US 8,777,488 B2
(45) Date of Patent: Jul. 15, 2014

(54) FLUID DYNAMIC BEARING MOTOR, AND RECORDING MEDIUM DRIVING APPARATUS

(75) Inventors: Hiromitsu Gotoh, Chiba (JP); Atsushi Ohta, Chiba (JP)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/614,360

(22) Filed: Sep. 13, 2012

(65) Prior Publication Data

US 2013/0020894 A1  Jan. 24, 2013

Related U.S. Application Data

(63) Continuation of application No. 12/800,891, filed on May 25, 2010, now Pat. No. 8,292,506, which is a continuation of application No. 11/629,013, filed as application No. PCT/JP2005/010175 on Jun. 2, 2005, now Pat. No. 7,736,061.

(30) Foreign Application Priority Data

Nov. 6, 2004  (JP) .................................. 2004-174712

(51) Int. Cl.
*F16C 32/06* (2006.01)
(52) U.S. Cl.
USPC ............ 384/100; 384/113; 384/114; 384/119
(58) Field of Classification Search
USPC ................. 384/100, 107, 114–115, 119–120, 384/123–124, 132, 135; 310/67, 90, 90.5, 310/99.08
See application file for complete search history.

(56) References Cited

U.S. PATENT DOCUMENTS

| | | |
|---|---|---|
| 5,114,245 A | 5/1992 | Tanaka et al. |
| 5,433,529 A | 7/1995 | Hensel |
| 5,634,724 A | 6/1997 | Zang et al. |
| 5,647,672 A | 7/1997 | Fukutani |
| 5,770,906 A | 6/1998 | Hazelton et al. |
| 5,791,785 A | 8/1998 | Nose et al. |
| 5,806,987 A | 9/1998 | Nose et al. |
| 5,876,124 A | 3/1999 | Zang et al. |
| 5,901,013 A | 5/1999 | Lee et al. |
| 5,957,589 A | 9/1999 | Lee et al. |

(Continued)

FOREIGN PATENT DOCUMENTS

| | | |
|---|---|---|
| JP | 6-121483 | 4/1994 |
| JP | 8-145049 | 6/1996 |

(Continued)

OTHER PUBLICATIONS

Office Action dated Aug. 28, 2009, issued in the file history of U.S. Patent No. 7,736,061.

(Continued)

*Primary Examiner* — Marcus Charles

(57) ABSTRACT

A motor includes a rotor having a permanent magnet; a sleeve rotatably supporting the rotor; fluid provided in a gap between the rotor and the sleeve; a stator having a electromagnet disposed opposite to the permanent magnet to rotate the rotor relative to the stator; and a boss interposed between the sleeve and the stator. In the motor, the sleeve, the stator, and the boss are provided as separate members.

11 Claims, 12 Drawing Sheets

(56) References Cited

U.S. PATENT DOCUMENTS

| | | | |
|---|---|---|---|
| 5,988,886 A | 11/1999 | Takahashi | |
| 6,036,368 A | 3/2000 | Takehara et al. | |
| 6,066,903 A | 5/2000 | Ichiyama | |
| 6,196,722 B1 * | 3/2001 | Asada et al. | 384/135 |
| 6,219,199 B1 * | 4/2001 | Sakuragi et al. | 360/99.08 |
| 6,252,322 B1 * | 6/2001 | Kawawada et al. | 384/100 |
| 6,271,612 B1 | 8/2001 | Tanaka et al. | |
| 6,296,391 B1 * | 10/2001 | Hayakawa et al. | 384/132 |
| 6,768,236 B2 * | 7/2004 | Tokunaga et al. | 384/114 |
| 6,827,495 B2 * | 12/2004 | Sakatani et al. | 384/124 |
| 6,828,709 B2 | 12/2004 | Grantz et al. | |
| 6,834,996 B2 | 12/2004 | Gomyo et al. | |
| 6,836,388 B2 | 12/2004 | Nishimura et al. | |
| 6,888,278 B2 | 5/2005 | Nishimura et al. | |
| 6,900,567 B2 | 5/2005 | Aiello et al. | |
| 6,980,394 B2 * | 12/2005 | Inoue et al. | 310/90 |
| 7,118,278 B2 * | 10/2006 | Gomyo et al. | 384/132 |
| 7,196,868 B2 | 3/2007 | Asada et al. | |
| 7,736,061 B2 | 6/2010 | Gotoh et al. | |
| 2001/0022869 A1 | 9/2001 | Tanaka et al. | |
| 2002/0085480 A1 * | 7/2002 | Higuchi | 369/271 |
| 2003/0048575 A1 | 3/2003 | Nishimura et al. | |
| 2003/0048577 A1 * | 3/2003 | Kayama et al. | 360/99.08 |
| 2003/0164653 A1 * | 9/2003 | Yasuda | 310/90 |
| 2004/0028298 A1 * | 2/2004 | Sakatani et al. | 384/107 |
| 2004/0028300 A1 | 2/2004 | Gomyo et al. | |
| 2004/0032175 A1 | 2/2004 | Grantz et al. | |
| 2004/0113501 A1 | 6/2004 | Tokunaga et al. | |
| 2005/0274018 A1 * | 12/2005 | Gomyo et al. | 29/898.02 |
| 2005/0286167 A1 * | 12/2005 | Yonei et al. | 360/99.08 |
| 2006/0029312 A1 * | 2/2006 | Kiriyama et al. | 384/107 |
| 2006/0087184 A1 * | 4/2006 | Kuyama et al. | 310/90 |
| 2006/0171615 A1 * | 8/2006 | Kodama | 384/100 |
| 2007/0253651 A1 | 11/2007 | Gotoh et al. | |

FOREIGN PATENT DOCUMENTS

| | | | | |
|---|---|---|---|---|
| JP | 9-191599 | | 7/1997 | |
| JP | 10-288221 | | 10/1998 | |
| JP | 2000206439 A | * | 7/2000 | G02B 26/10 |
| JP | 2001-27225 | | 1/2001 | |
| JP | 2001032827 A | * | 2/2001 | F16C 17/10 |
| JP | 2001056023 A | * | 2/2001 | F16C 17/10 |
| JP | 2001-065552 | | 3/2001 | |
| JP | 2002-155943 | | 5/2002 | |
| JP | 2002-372039 | | 12/2002 | |
| JP | 2003-148457 | | 5/2003 | |
| JP | 2003153491 A | * | 5/2003 | H02K 5/16 |
| JP | 2003-314535 | | 11/2003 | |
| JP | 2003333797 A | * | 11/2003 | H02K 7/08 |
| JP | 2003-348792 | | 12/2003 | |
| JP | 2004-052987 | | 2/2004 | |
| JP | 2004-088816 | | 3/2004 | |
| JP | 2004-132455 | | 4/2004 | |
| JP | 2005-127510 | | 5/2005 | |

OTHER PUBLICATIONS

Notice of Allowance dated May 5, 2010, issued in the file history of U.S. Patent No. 7,736,061.

Issue Notification dated Jun. 15, 2010, issued in the file history of U.S. Patent No. 7,736,061.

US Office Action dated Sep. 12, 2011 issued in the file history of U.S. Appl. No. 12/926,457.

Office Action dated May 24, 2011, issued in the file history of U.S. Appl. No. 12/800,891.

Office Action dated Feb. 23, 2012, issued in the file history of U.S. Appl. No. 12/800,891.

Notice of Allowance dated Jul. 6, 2012, issued in the file history of U.S. Appl. No. 12/800,891.

U.S. Appl. No. 12/926,457, filed Nov. 18, 2010, Gotoh et al., Samsung Electro-Mechanics Co., Ltd.

U.S. Appl. No. 12/800,891, filed May 25, 2010, Gotoh et al., Samsung Electro-Mechanics Co., Ltd.

U.S. Appl. No. 11/629,013, filed May 4, 2007, Gotoh et al., Samsung Electro-Mechanics Co., Ltd.

Japanese Office Action issued Oct. 29, 2013 in corresponding Japanese Application No. 2012-278399.

* cited by examiner

FLUID DYNAMIC BEARING MOTOR, AND RECORDING MEDIUM DRIVING APPARATUS

CROSS-REFERENCE TO RELATED APPLICATIONS

This application is a continuation and claims priority to U.S. application Ser. No. 12/800,891, now U.S. Pat. No. 8,292,506 filed May 25, 2010, which is a continuation of U.S. application Ser. No. 11/629,013, filed May 4, 2007 now U.S. Pat. No. 7,736,061, which was a U.S. national stage application of International Application No. PCT/JP05/10175, filed Jun. 2, 2005, which in turn claims the benefit of Japanese Patent Application 2004-174712 filed with the Japanese Patent Office on Jun. 11, 2004, the disclosures of which are incorporated herein by reference in their entirety.

BACKGROUND

1. Field

Embodiments relate to fluid dynamic bearings, motors, and recording-medium driving apparatuses.

2. Description of the Related Art

Fluid dynamic bearings are used as shaft bearings for apparatuses requiring high rotational accuracy. This type of bearing has a gap, filled with a working fluid, between a shaft and a housing to rotatably support the shaft relative to the housing. When the bearing rotates, the working fluid produces a dynamic pressure to keep the shaft and the housing out of contact with each other.

An example of an apparatus requiring high rotational accuracy is a recording medium such as a hard disk. The rotational speed and accuracy of hard disks are becoming increasingly higher with increasing recording density.

Fluid dynamic bearings are suitable for use in spindle motors for driving recording media having increasingly higher rotational speed and accuracy, including hard disks.

The demand for reduction in the size and thickness of recording media such as hard disks, as well as higher rotational speed and accuracy, has been increasing in recent years. Accordingly, various techniques have been disclosed to provide thinner fluid dynamic bearings.

In particular, a thrust bearing of the dynamic bearing unit disclosed in Japanese Patent Publication No. 2001-65552 includes a sleeve having a flange (thrust plate) defining a thrust dynamic bearing portion and a shaft member having a circumferential portion surrounding the flange. A fluid such as oil is provided between axially opposing surfaces of the flange of the sleeve and the circumferential portion of the shaft member to produce a dynamic pressure when the shaft member rotates. The flange has pressure-generating grooves for producing dynamic pressure in the oil when the shaft member rotates. The dynamic bearing unit also includes an absorbing sheet for absorbing oil leaking from the thrust bearing.

However, in Japanese Patent Publication No. 2001-65552, because the dynamic bearing unit is started with the surface of the flange where the pressure-generating grooves are provided and the inner surface of the shaft member close to each other, the grooves attract the surrounding oil to produce a negative pressure that causes bubbles in oil-poor regions. These bubbles degrade the lubrication performance of the oil and can thus cause problems such as vibration due to unstable rotation and, at worst, fusion of the bearing due to metal-to-metal contact. In addition, the oil can leak out of the thrust bearing because the bubbles squeeze the oil. Although the absorbing sheet absorbs the leaking oil, an oil film forms between the thrust bearing and the absorbing sheet. This oil film is no longer easy to cut off and is thus constantly fed to the absorbing sheet. Accordingly, the absorbing sheet continues to absorb the oil until becoming saturated. As a result, the amount of oil provided on the thrust bearing decreases and, furthermore, the oil can be totally depleted. This makes it difficult to maintain the operation of the fluid dynamic bearing.

SUMMARY

In light of the above problems, an aspect of the present invention is to provide a thinner fluid dynamic bearing capable of stable shaft rotation, a motor including the bearing, and a recording-medium driving apparatus including the bearing.

In accordance with one aspect, a motor includes a rotor having a permanent magnet; a sleeve rotatably supporting the rotor; fluid provided in a gap between the rotor and the sleeve; a stator having a electromagnet disposed opposite to the permanent magnet to rotate the rotor relative to the stator; and a boss interposed between the sleeve and the stator, the sleeve, the stator, and the boss being provided as separate members.

In the motor, the rotor may include a shaft, and two radial pressure-generating regions may be formed in an axial direction in a radially opposed region of an inner circumferential surface of the sleeve and an outer circumferential surface of the shaft.

In the motor, the inner surface of the boss may be fixed to the sleeve, and the outer surface of the boss may be fixed to the stator.

In the motor, the stator may include an axially extending portion formed on an inner edge thereof, and the extending portion may be fixed to the boss.

In the motor, the uppermost surface of the extending part may be lower than the uppermost surface of the boss.

In the motor, the stator may be formed of a magnetic material.

In the motor, a magnetic material layer may be disposed on the surface of the permanent magnet opposite to the stator.

In the motor, a groove may be provided in the outer surface of the sleeve and may be formed by C-beveling the corner of a butting portion of the sleeve.

In the motor, the rotor may include a shaft and a circular plate extending radially outward from the shaft, the sleeve may include a cylinder rotatably supporting the shaft and a flange-shaped portion extending radially outward from the cylinder, a stopper may be engaged with the circular plate such that the flange-shaped portion is held between the circular plate and the stopper, at least part of the outer surface of the cylinder may form a cylinder seal surface and at least part of the inner surface of the stopper forms a stopper seal surface, and the cylinder seal surface and the stopper seal surface may form a tapered section, and a fluid-air interface may be formed in the tapered section.

In the motor, the fluid-air interface may be formed above the boss.

In the motor, the boss may include a step accommodating at least part of the stopper.

In the motor, the stopper seal surface may be longer than the cylinder seal surface.

In the motor, a bottom plate may close the bottom end of the cylinder, and the lowermost surface of the bottom plate may be higher than the lowermost surface of the boss.

Additional aspects will be set forth in part in the description which follows and, in part, will be apparent from the description, or may be learned by practice of the invention.

BRIEF DESCRIPTION OF THE DRAWINGS

These and/or other aspects will become apparent and more readily appreciated from the following description of embodiments, taken in conjunction with the accompanying drawings of which.

DESCRIPTION OF EMBODIMENTS

Figure 1:
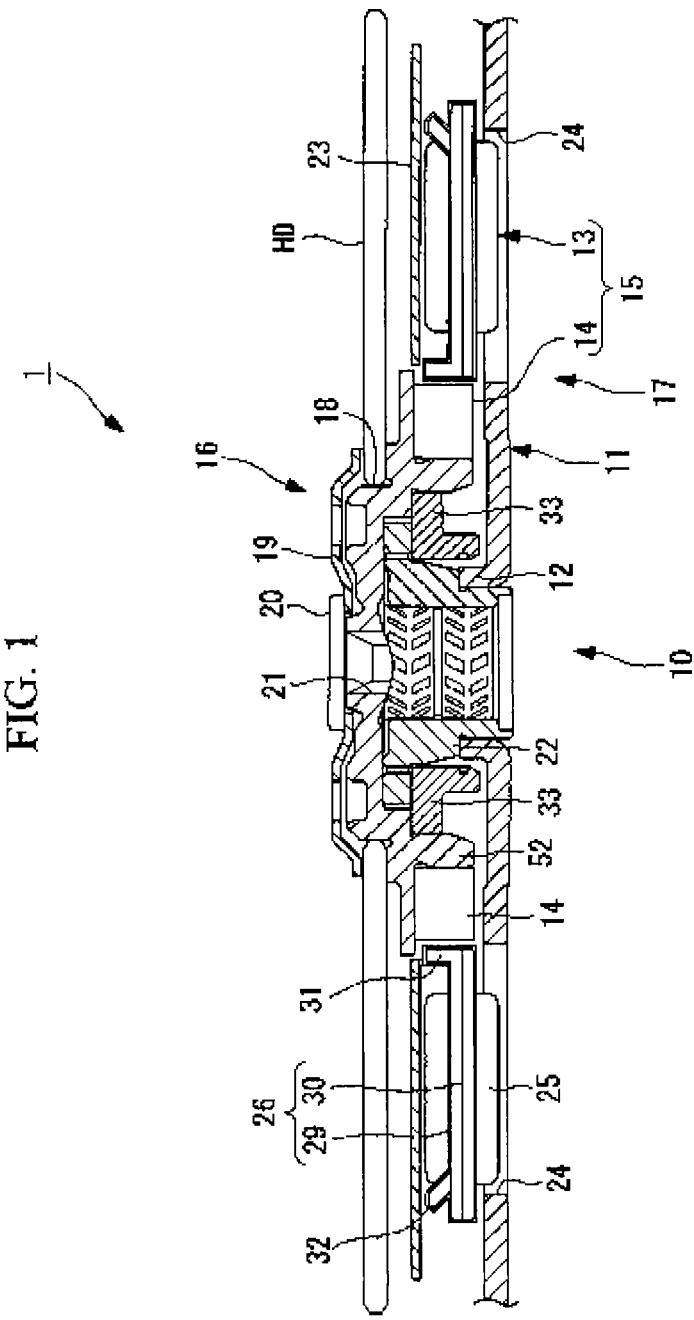
FIG. 1 is a sectional view of a recording-medium driving apparatus according to an embodiment.

Reference will now be made in detail to embodiments, examples of which are illustrated in the accompanying drawings, wherein like reference numerals refer to like elements throughout.

A fluid dynamic bearing, a motor, and a recording-medium driving apparatus according to an embodiment will now be described with reference to FIGS. 1 to 10.

FIG. 1 is a sectional view of the overall structure of the recording-medium driving apparatus according to the embodiment.

In FIG. 1, a fluid dynamic bearing 10 according to this embodiment is applied to a recording-medium driving apparatus 1. The recording-medium driving apparatus 1 includes a motor 17 including a stator 11 having electromagnets 13 annularly arranged inside the stator 11, a rotor (shaft member) 16 having a permanent magnet 14 disposed opposite the electromagnets 13, and the fluid dynamic bearing 10, which rotatably supports the rotor 16 relative to the stator 11. The electromagnets 13 of the stator 11 and the permanent magnet 14 of the rotor 16 constitute a drive unit 15 to rotate the rotor 16 relative to the stator 11.

The rotor 16 has a fitting portion (fixing portion) 18 fitted to a recording medium HD having an annular disc shape and a screw hole 21 into which a screw 20 is inserted to attach a pressing member 19 for fixing the recording medium HD. The pressing member 19 is formed of an annular plate having a convex shape in cross section and is attached to the rotor 16 by the screw 20. The recording medium HD is fitted to the fitting portion 18 of the rotor 16 and is pressed thereagainst by the pressing member 19 so that the recording medium HD is integrated with the rotor 16.

The stator 11 has a boss 12 disposed in the center of the electromagnets 13. A sleeve (support) 22 of the fluid dynamic bearing 10, as described later, is fitted to the boss 12 such that the permanent magnet 14 of the rotor 16 faces the electromagnets 13. A shield plate 23 is disposed between the electromagnets 13 and the recording medium HD to block magnetic fields generated by the electromagnets 13 and the permanent magnet 14. The shield plate 23 can reduce the effect of the magnetic fields of the electromagnets 13 and the permanent magnet 14 in the vicinity of the recording medium HD to avoid errors when information is read from the recording medium HD.

The stator 11 also has a stator opening 24 for accommodating coils 25 (described later) of the electromagnets 13. This stator opening 24 allows the electromagnets 13 to be brought closer to the stator 11 (to the bottom side of FIG. 1), thus facilitating a reduction in the thickness of the recording-medium driving apparatus 1.

Figure 2:
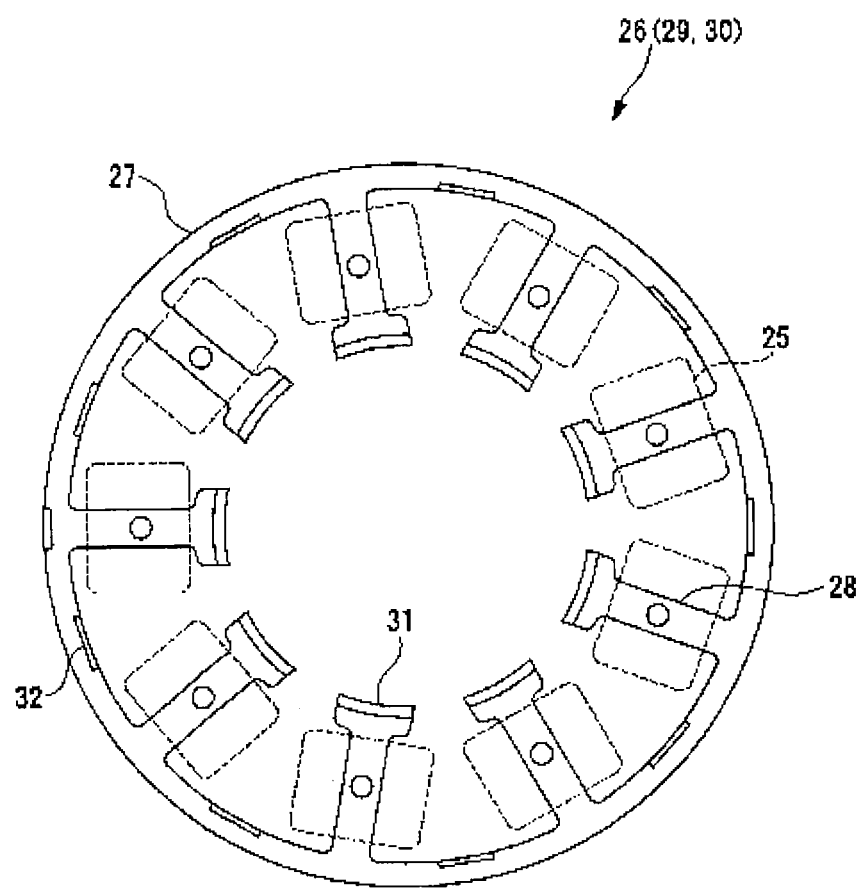
FIG. 2 is a plan view of a core plate shown in FIG. 1.

FIG. 2 is a plan view of a core plate 26 of the recording-medium driving apparatus 1 shown in FIG. 1.

In FIGS. 1 and 2, the electromagnets 13 are composed of the coils 25 and the core plate 26, which includes two metal plates around which the coils 25 are wound. The coils 25 are supplied with a three-phase alternating current to generate an alternating magnetic field. In FIG. 2, the core plate 26 has an annular core back 27 and radially inwardly extending teeth 28 that are wider circumferentially at leading ends thereof than outer portions thereof. The coils 25 are wound around the teeth 28.

In FIG. 1, the core plate 26 includes a first plate 29 facing the recording medium HD and a second plate 30 facing the stator 11. These plates 29 and 30 are stacked on top of each other. The first plate 29 has facing portions 31 facing the permanent magnet 14 substantially in parallel therewith. The facing portions 31 are formed by bending the leading ends of the teeth 28 toward the recording medium HD. The first plate 29 also has retaining portions 32 on the core back 27 to retain wiring lines extending between the coils 25. The retaining portions 32 are formed by cutting the core back 27 and bending up the cut portions thereof.

The facing portions 31 can increase the area where the electromagnets 13 face the permanent magnet 14 to enhance the driving force of the drive unit 15.

The core plate 26 is disposed such that the bottom end of the second plate 30 is positioned substantially in the same plane as the bottom end of the permanent magnet 14 and such that the top ends of the facing portions 31 of the first plate 29 are positioned substantially in the same plane as the top end of the permanent magnet 14.

This structure allows the core plate 26 to be brought closer to the stator 11, thus facilitating a reduction in the thickness of the recording-medium driving apparatus 1.

The electromagnets 13 can thus generate an alternating magnetic field acting on the permanent magnet 14 to rotate the rotor 16 relative to the stator 11.

Figure 3:
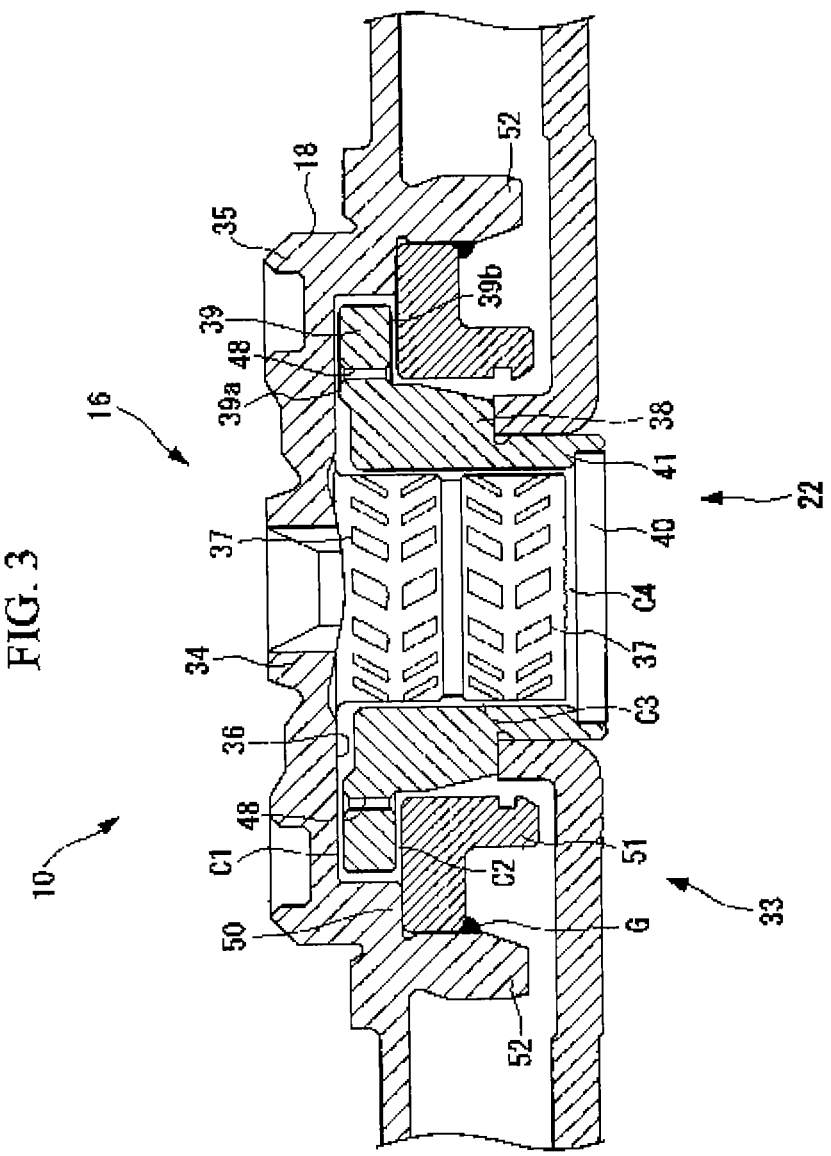
FIG. 3 is an enlarged sectional view of a fluid dynamic bearing shown in FIG. 1.

FIG. 3 is a sectional view of the fluid dynamic bearing of the recording-medium driving apparatus shown in FIG. 1.

In FIG. 3, the fluid dynamic bearing 10 according to this embodiment mainly includes the rotor 16 described above, the sleeve (support) 22 rotatably supporting the rotor 16, and a stopper 33 configured to prevent the rotor 16 from being detached from the sleeve 22.

The rotor 16 integrally includes a substantially cylindrical shaft (cylindrical portion) 34 and a circular, flange-shaped plate 35 extending radially outward from an end of a circumferential surface of the shaft 34, around the circumference thereof. A recess 36 and a yoke 52 are provided on a surface of the circular plate 35 opposite the sleeve 22. The recess 36 accommodates a thrust bearing portion 39, described later. The yoke 52 holds the stopper 33 and the permanent magnet 14. The fitting portion 18, which is fitted to the recording medium HD, is disposed on the top surface (facing upward in FIG. 3) of the circular plate 35.

The shaft 34 has two arrays of radial-pressure-generating grooves 37, called herringbone grooves, arranged axially in the circumferential surface of the shaft 34. Each of the arrays of the radial-pressure-generating grooves 37 includes grooves extending from one end of the shaft 34 in a direction inclined with respect to the generating line of the cylindrical surface of the shaft 34 and grooves extending from the circular plate 35 side in a direction inclined to the opposite direction. That is, the radial-pressure-generating grooves 37 are arranged in pairs so as to diverge in the rotational direction of the shaft 34. In FIG. 1, the pairs of grooves 37 are separated so as not to intersect each other, although they may intersect each other to form bent grooves.

The sleeve (support) 22 includes a cylinder 38 having a cylindrical opening for rotatably supporting the shaft 34 and the recess 36 accommodates the thrust bearing portion 39, which is flange-shaped so as to extend radially outward from an end of a circumferential surface of the cylinder 38, around the circumference thereof.

A bottom plate 40 is disposed at the bottom end (facing downward in FIG. 3) of the cylinder 38 to close the bottom end and defines the bottom surface thereof.

Figure 4:
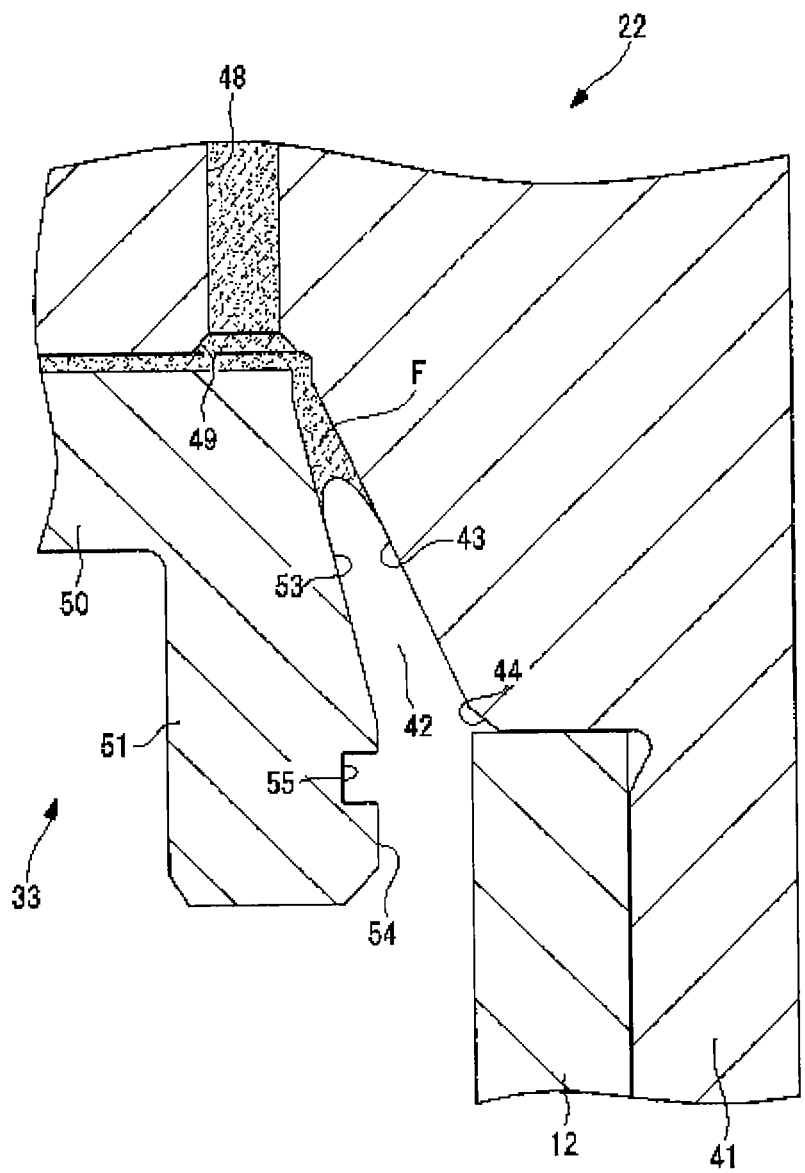
FIG. 4 is an enlarged sectional view of a capillary seal shown in FIG. 3.

FIG. 4 is an enlarged sectional view of a capillary seal 42 of the fluid dynamic bearing 10 shown in FIG. 3.

In FIGS. 3 and 4, the cylinder 38 has a sleeve fitting portion 41 fitted to the boss 12 of the stator 11 on the bottom of the cylinder 38 and a sleeve seal surface (cylinder seal surface) 43 between the thrust bearing portion 39 and the sleeve fitting portion 41. The capillary seal 42 is defined between the sleeve seal surface 43 and a stopper seal surface 53, described later. The sleeve seal surface 43 is inclined radially inward so as to extend toward the sleeve fitting portion 41. The sleeve seal surface 43 is beveled to form an oil-blocking surface 44 at a step between the sleeve seal surface 43 and the sleeve fitting portion 41.

Figure 5A:
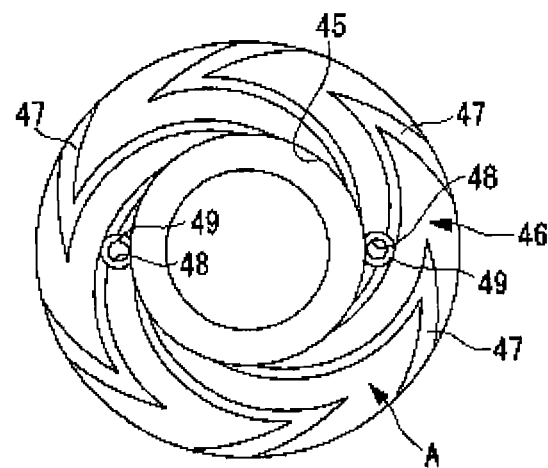
FIG. 5A is a plan view of thrust-pressure-generating grooves and through-holes formed in a top end surface of a thrust bearing portion shown in FIG. 3.
Figure 5B:
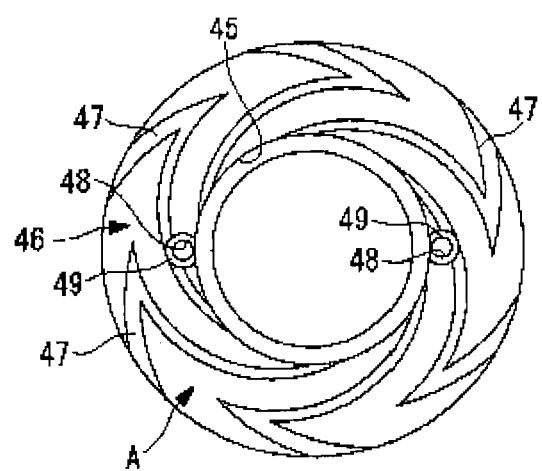
FIG. 5B is a plan view of thrust-pressure-generating grooves and through-holes formed in a bottom end surface of the thrust bearing portion shown in FIG. 3.

FIG. 5A is a plan view of thrust-pressure-generating grooves formed in a top end surface of the thrust bearing portion of the fluid dynamic bearing according to this embodiment. FIG. 5B is a plan view of thrust-pressure-generating grooves formed in a bottom end surface of the thrust bearing portion of the fluid dynamic bearing according to this embodiment.

In FIGS. 5A and 5B, annular clearance portions 45 and annular thrust surfaces 46 are disposed in the top end surface 39a and bottom end surface 39b of the thrust bearing portion 39 shown in FIG. 3 in the thickness direction thereof. The clearance portions 45 are formed radially inside the thrust bearing portion 39 around the circumference thereof. The thrust surfaces 46 are formed adjacent to the clearance portions 45 so as to extend radially outward therefrom. Many thrust-pressure-generating grooves (pressure-generating grooves) 47, called herringbone grooves, are formed in the thrust surfaces 46. These thrust-pressure-generating grooves 47 extend radially outward from the clearance portions 45 in a direction inclined with respect to the radial direction in an arc shape and are bent at a midway position (midway portion) thereof in a direction inclined to the opposite direction before reaching the outer edges.

In FIGS. 3, 5A and 5B, the thrust bearing portion 39 has two through-holes 48 extending through the thrust bearing portion 39 along the thickness thereof. These through-holes 48 are separated from each other by an angular distance of 180° around the central axis of the shaft 34 so that they are aligned in the same radial direction. The through-holes 48 are formed at positions of the thrust surfaces 46 adjacent to the clearance portions 45. The through-holes 48 have beveled portions 49 formed around end openings thereof in the thrust surfaces 46. The beveled portions 49 are flared and tapered so as to diverge gradually toward the openings and overlap the clearance portions 45 on the opening side. Thus, groove walls of the clearance portions 45 are partially removed so as to define communicating recesses connecting the through-holes 48 to the clearance portions 45.

In FIGS. 3 and 4, the stopper 33 mainly includes a circular stopper plate 50 for preventing the rotor 16 from being detached from the sleeve 22 and a seal cylinder 51 that defines the capillary seal 42 in combination with the sleeve 22.

The circular stopper plate 50 is fixed to the yoke 52 of the rotor 16 so that the thrust bearing portion 39 is held between the circular stopper plate 50 and the recess 36. The circular stopper plate 50 may be fixed to the yoke 52 using an adhesive G or by welding. The circular stopper plate 50 is preferably fixed to the yoke 52 without any gap to prevent oil, described later, from leaking from therebetween.

The seal cylinder 51 extends from an inner circumferential surface of the circular stopper plate 50 toward the stator 11. The stopper seal surface 53 is provided inside the seal cylinder 51 so that the capillary seal 42 is defined in a region between the stopper seal surface 53 and the sleeve seal surface 43. The stopper seal surface 53 is inclined radially inward so as to extend away from the circular stopper plate 50. The seal cylinder 51 has an annular groove 55 in an inner cylinder circumferential surface 54 adjacent to the end of the stopper seal surface 53 facing away from the circular stopper plate 50. The inner cylinder circumferential surface 54 may be cylindrical or inclined in the same manner as the stopper seal surface 53.

The capillary seal 42 is defined between the sleeve seal surface 43 and the stopper seal surface 53 so as to diverge in a direction away from the circular stopper plate 50.

A space outside the seal cylinder 51 in the radial direction may be used to accommodate, for example, the permanent magnet 14.

In FIG. 3, gaps C1 to C4 are defined between the shaft 34 and the sleeve 22 and between the sleeve 22 and the stopper 33. That is, the gap C1 is defined between the thrust surface 46 of one end surface 39a of the thrust bearing portion 39, where the thrust-pressure-generating grooves 47 are formed, and the opposite inner surface of the recess 36 of the rotor 16. The gap C2 is defined between the thrust surface 46 of the other end surface 39b of the thrust bearing portion 39 and the opposite surface of the stopper 33. The gap C3 is uniformly defined between the circumferential surface of the shaft 34, where the radial-pressure-generating grooves 37 are formed, and the inner circumferential surface of the cylinder 38, with the shaft 34 disposed in the center of the cylinder 38. The gap C4 is defined between an end surface of the shaft 34 and the bottom plate 40 of the sleeve 22.

The gaps C1 to C3 are filled with an oil (working fluid) F. The liquid surface of the oil F is positioned in the capillary seal 42, where the oil F can be held and prevented from leaking out by surface tension.

When the rotor 16 rotates around the central axis thereof in one direction relative to the sleeve 22, the oil F is attracted along the radial-pressure-generating grooves 37 from near the bottom plate 40 and the circular plate 35 into a region of the gap C3 where the radial-pressure-generating grooves, 37 are formed. The attracted oil F forms a peak-pressure region around the circumference of the shaft 34. The dynamic pressure of the region maintains the shaft 34 substantially in the center of the sleeve 22 in the radial direction.

The oil F is also attracted along the thrust-pressure-generating grooves 47 from near the outer edges of the thrust surfaces 46 and the clearance portions 45 into the gaps C1 and C2 to form annular pressure-generating regions A where a dynamic pressure is generated around the circumference of the thrust bearing portion 39. The dynamic pressure of the regions allows the thrust bearing portion 39 to rotate substantially in the center in the axial direction, between the inner surface of the recess 36 and the surface of the stopper 33.

The operation of the fluid dynamic bearing 10, the motor 17 including the bearing 10, and the recording-medium driving apparatus 1 including the bearing 10 according to this embodiment will be described.

The recording-medium driving apparatus 1 starts to rotate the recording medium HD by supplying a three-phase alternating current to the coils 25 of the stator 11 of the motor 17. The coils 25 then generate an alternating magnetic field acting on the permanent magnet 14 to rotate the rotor 16. The recording medium HD rotates as the rotor 16 rotates because the recording medium HD is fixed to the rotor 16.

As the rotor 16 rotates in one direction, the shaft 34, which is integrated with the rotor 16, rotates in the direction. The rotation of the shaft 34 causes the radial-pressure-generating grooves 37, which are disposed on the shaft 34, and the thrust-pressure-generating grooves 47, which are disposed on the sleeve 22, to produce dynamic pressure in the gaps C1 to C3. The dynamic pressure produced around the circumferential surface of the shaft 34 is uniform around the circumference thereof, so that the shaft 34 is kept in balance along the central axis of the sleeve 22. The dynamic pressure produced around the thrust surfaces 46 of the thrust bearing portion 39 pushes the thrust bearing portion 39 uniformly in the thickness direction thereof, so that the thrust bearing portion 39 is kept in balance substantially in the center in the axial direction in the space between the inner surface of the recess 36 of the rotor 16 and the surface of the stopper 33.

No dynamic pressure occurs when the motor 17 is stopped, and thus the rotor 16 falls in the gravity direction inside the sleeve 22. If, for example, the recording-medium driving apparatus 1 is oriented as shown in FIG. 1, the rotor 16 falls axially with respect to the sleeve 22, and accordingly the upper gap C1 becomes narrower than the lower gap C2. When the motor 17 is started in this state, the thrust-pressure-generating grooves 47 attract the oil F radially outward from near the clearance portions 45 in the gaps C1 and C2. In the fluid dynamic bearing 10 according to this embodiment, the oil F is supplied from the lower gap C2, which is wider, to the upper gap C1, which is narrower, through the through-holes 48 provided in the thrust surfaces 46.

This structure can avoid an excessive negative pressure when the oil F is attracted into the narrower gap C1, thus preventing generation of bubbles in the oil F. In particular, the generation of bubbles can be prevented even after sudden attraction of the oil F on startup because the oil F can be directly supplied to the thrust surfaces 46 through the through-holes 48 provided therein.

According to this embodiment, additionally, the beveled portions 49 provided around the openings of the through-holes 48 can enhance the effect described above because the beveled portions 49 allow smooth, distributed supply of the oil F over the pressure-generating regions A from the through-holes 48.

The prevention of bubbles in the oil F contributes to suppression of variations of the dynamic pressure occurring in the pressure-generating regions A so that the rotor 16 can be stably rotated without vibrations. The prevention of bubbles also allows the oil F to constantly separate the rotor 16 and the sleeve 22 and to constantly separate the sleeve 22 and the stopper 33, thus preventing, for example, damage due to contact therebetween.

In addition, the fluid dynamic bearing 10 can prevent problems such as oil leakage because no bubbles squeeze the oil F from the gaps C1 to C4. Accordingly, the fluid dynamic bearing 10 can eliminate the need to use an absorbing member for absorbing leaking oil, thus facilitating a reduction in the thickness of the recording-medium driving apparatus 1.

If bubbles occur or are originally present, they are sucked into the through-holes 48 as the rotor 16 rotates. These bubbles do not cause the problems described above because the bubbles remain in the through-holes 48 and are not attracted into the pressure-generating regions A.

In addition, in the fluid dynamic bearing 10 according to this embodiment, the through-holes 48 are provided at two positions symmetrical with respect to the central axis. This arrangement allows distributed supply of the oil F over the pressure-generating regions A and ensures the weight and rotation balance of the rotor 16.

As described above, the recording-medium driving apparatus 1 including the motor 17 including the fluid dynamic bearing 10 according to this embodiment can stably rotate the recording medium HD without vibrations to achieve accurate writing and reading of information to and from the recording medium HD.

The thrust-pressure-generating grooves 47 are formed so as to produce a higher dynamic pressure around the outer edge of the thrust bearing portion 39 than around the inner edge of the thrust bearing portion 39 by, for example, shifting the bending points of the thrust-pressure-generating grooves 47 radially outward or varying the height thereof so that they have different heights between the inner and outer portions in the radial direction. The higher dynamic pressure provides a larger force tending to support the rotor 16 and the sleeve 22 around the outer edge of the thrust bearing portion 39. As a result, the rotor 16 can be stably supported during rotation to reduce nonrepeatable runout (NRRO).

The surface tension of the oil F in the capillary seal 42 tends to decrease the liquid surface area of the oil F, that is, tends to push the oil F in a direction in which the sleeve seal surface 43 and the stopper seal surface 53 approach each other. The capillary seal 42 can therefore hold the oil F and prevent it from leaking out.

In addition, as the rotor 16 rotates, the oil F is rotated by friction with the stopper seal surface 53 and experiences a centrifugal force. This centrifugal force presses the oil F against the stopper seal surface 53 and pushes it toward the thrust bearing portion 39 along the stopper seal surface 53.

The capillary seal 42 can therefore more reliably hold the oil F during the rotation of the rotor 16.

Furthermore, because the capillary seal 42 can prevent oil leakage, it can eliminate the need to use an absorbing member for absorbing leaking oil, thus facilitating a reduction in the thickness of the recording-medium driving apparatus 1.

Figure 6:
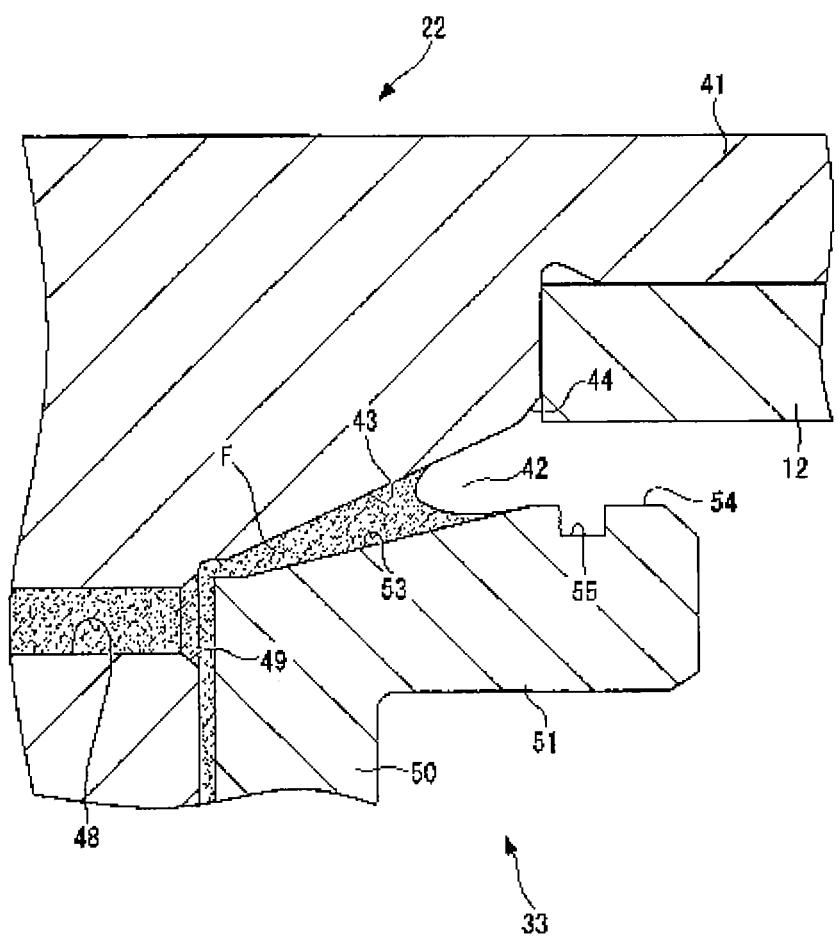
FIG. 6 is a diagram illustrating the effect of the capillary seal shown in FIG. 4.
Figure 7:
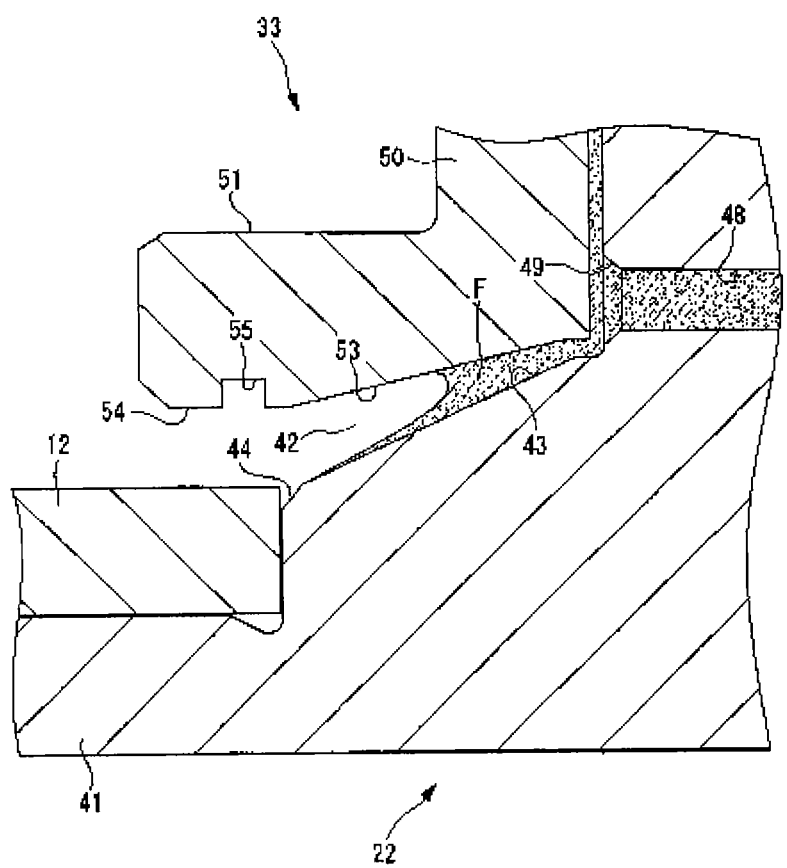
FIG. 7 is a diagram illustrating the effect of the capillary seal shown in FIG. 4.

The shape of the liquid surface of the oil F in the capillary seal 42 is varied by gravity if the recording-medium driving apparatus is oriented horizontally, as shown in FIGS. 6 and 7.

If the stopper seal surface 53 is located at a lower position, as shown in FIG. 6, the oil F spreads to the right in FIG. 6 along the stopper seal surface 53 due to gravity. The groove 55 can then prevent the oil F from further spreading to the right, thus holding the oil F and preventing it from leaking out.

If the sleeve seal surface 43 is located at a lower position, as shown in FIG. 7, the oil F spreads to the left in FIG. 7 along the sleeve seal surface 43 due to gravity. The oil-blocking surface 44 can then prevent the oil F from further spreading to the left, thus holding the oil F and preventing it from leaking out.

Figure 8:
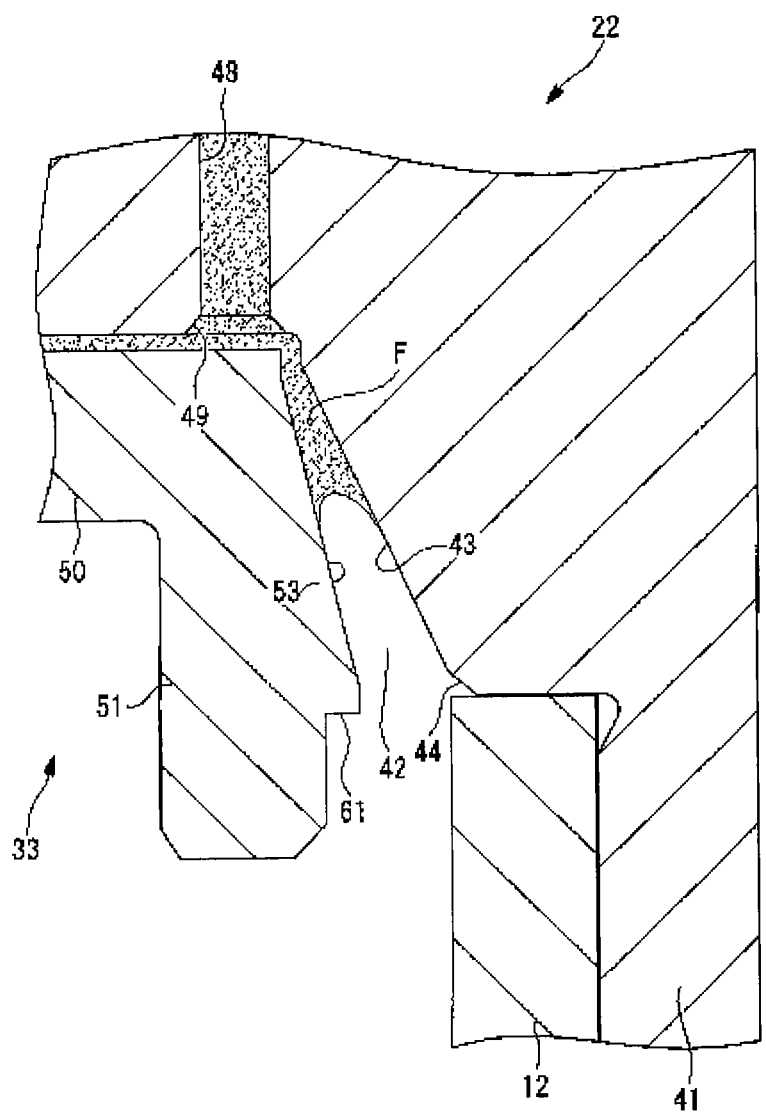
FIG. 8 is an enlarged sectional view of a capillary seal according to another embodiment.

Although the groove 55 may be formed on the stopper 33 to prevent the leakage of the oil F, as described above, a step 61 may be formed to prevent the leakage of the oil F, as shown in FIG. 8.

The step 61 is formed in the inner cylinder circumferential surface 54 so as to extend radially outward. The step 61 can prevent the movement of the oil F to hold and prevent it from leaking out.

Figure 9A:
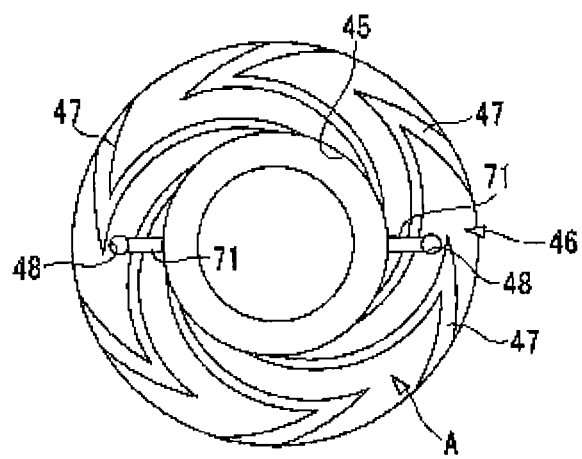
FIG. 9A is a plan view of thrust-pressure-generating grooves and through-holes formed in a top end surface of a thrust bearing portion according to another embodiment.
Figure 9B:
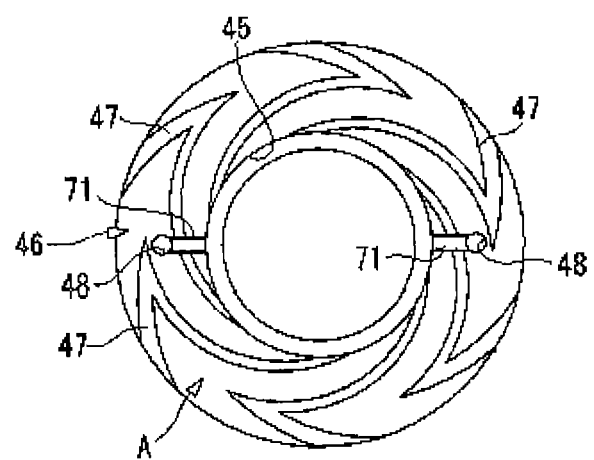
FIG. 9B is a plan view of thrust-pressure-generating grooves and through-holes formed in a bottom end surface of the thrust bearing portion according to the other embodiment.

Although the through-holes 48 and the clearance portions 45 are connected through the beveled portions 49 provided around the openings of the through-holes 48 in this embodiment, as shown in FIGS. 4, 5A and 5B, linear communicating grooves 71 may instead be provided to directly connect the through-holes 48 and the clearance portions 45, as shown in FIGS. 9A and 9B. In this case, the communicating grooves 71 preferably have substantially the same depth as the clearance portions 45 to allow bubbles to smoothly escape from the clearance portions 45 into the through-holes 48 without being trapped at any step. Also, sloped portions may be provided such that the depth thereof decreases gradually from the clearance portions 45 to the through-holes 48. These sloped portions allow bubbles to smoothly escape into the through-holes 48 without being trapped at any step.

Figure 10A:
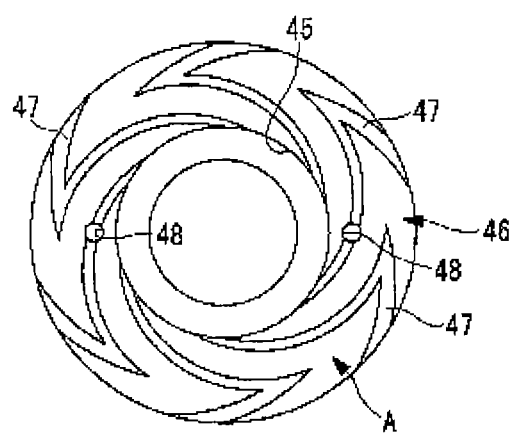
FIG. 10A is a plan view of thrust-pressure-generating grooves and through-holes formed in a top end surface of a thrust bearing portion according to another embodiment.
Figure 10B:
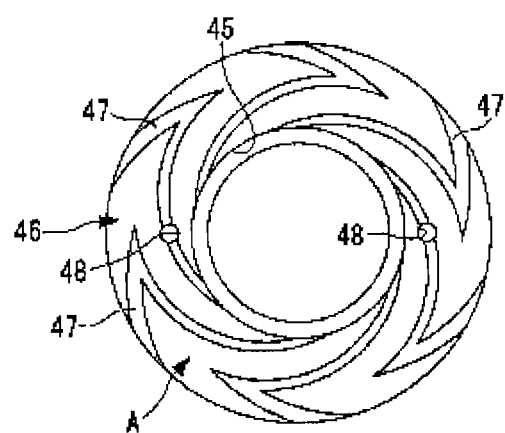
FIG. 10B is a plan view of thrust-pressure-generating grooves and through-holes formed in a bottom end surface of the thrust bearing portion according to the other embodiment.

Referring to FIGS. 10A and 10B, alternatively, the through-holes 48 may be positioned so as to coincide with any of the thrust-pressure-generating grooves 47. In this case, the thrust-pressure-generating grooves 47 themselves can be used as communicating grooves for connecting the through-holes 48 and the clearance portions 45.

Figure 11:
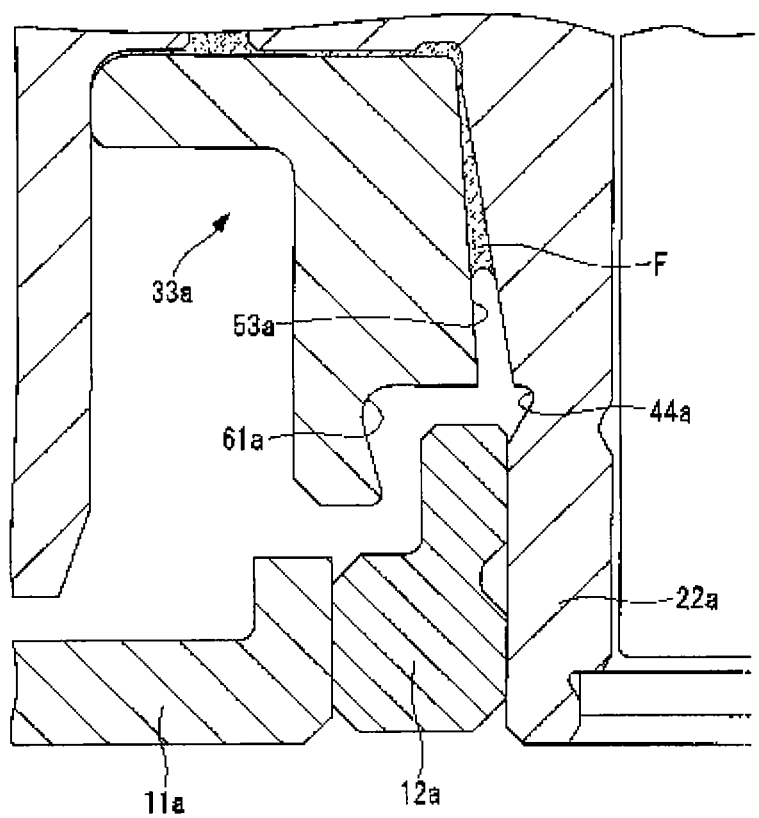
FIG. 11 is an enlarged sectional view of a sleeve and a boss according to another embodiment

Although the boss 12 of the stator 11 may be disposed so as to butt against the end surface of the sleeve 22 (see FIG. 1), as described above, a boss 12a may be disposed so as to butt against an end surface of a sleeve (support) 22a, as shown in FIG. 11. Further, the fluid-air interface is formed above the boss 12a.

In the structure shown in FIG. 11, an annular oil-blocking groove 44a is provided in a side surface of the sleeve 22a instead of the oil-blocking surface 44 (see FIG. 4), which is formed by C-beveling the corner of a butting portion of the sleeve 22. The oil-blocking groove 44a has the same effect as the oil-blocking surface 44, that is, the effect of preventing the leakage of the oil F.

In addition, a step 61a is provided at the bottom end (the lower end in FIG. 11) of the stopper seal surface 53a of the stopper 33a so that the stopper 33a does not butt against the boss 12a. The boss 12a also includes a step accommodating at least part of the stopper 33a. The step 61a has the same effect as the step 61, that is, the effect of preventing the leakage of the oil F.

The boss 12a and the stator 11a are provided as separate members, and the sleeve 22a is disposed inside the boss 12a. The axially extending portion of the stator 11a is formed on an inner edge thereof, and the extending portion is fixed to the boss 12a. In FIG. 11, the uppermost surface of the extending part is lower than the uppermost surface of the boss 12a. Further, the bottom plate 40 closes the bottom end of the sleeve 22a, and the lowermost surface of the bottom plate 40 is higher than the lowermost surface of the boss 12a. The relative positions of the boss 12a and the sleeve 22a can be constantly maintained because they are positioned using a jig during assembly.

Figure 12:
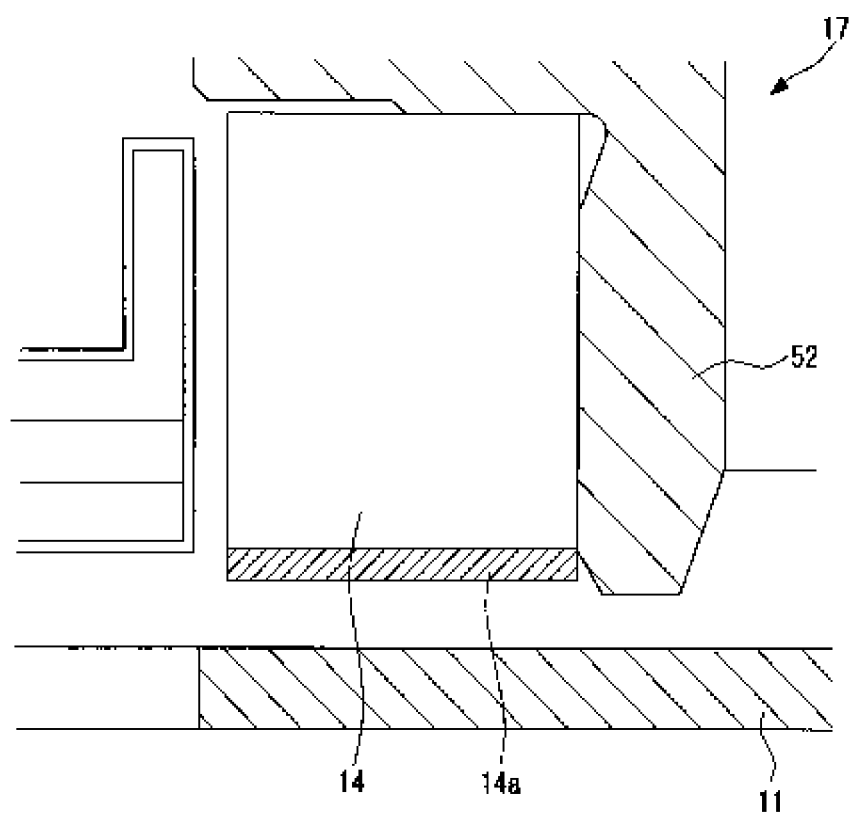
FIG. 12 is an enlarged sectional view of a permanent magnet according to another embodiment.

Although no component is disposed on a surface of the permanent magnet 14 opposite to the stator 11 (see FIG. 1), as described above, a magnetic material layer 14a may be disposed on the surface of the permanent magnet 14 opposite to the stator 11a formed of a magnetic material, as shown in FIG. 12.

In the structure shown in FIG. 12, the magnetic material layer 14a restrains the direction of a magnetic flux exiting and entering pole surfaces of the permanent magnet 14 to prevent the magnetic flux from reaching the stator 11. Therefore, even if the stator 11 is formed of a magnetic material such as iron, the permanent magnet 14 can be rotated relative to the stator 11 in close proximity without causing iron losses, including eddy current loss leading to loss of the power of the motor 17 and magnetic hysteresis loss. In addition, this structure allows the permanent magnet 14 to be positioned close to the surface of the stator 11, thus contributing to a reduction in the thickness of the motor 17. The permanent magnet 14 may have an anticorrosive coating. The coating used may be, for example, an electrodeposited epoxy layer or a nickel plating layer typically having a thickness of about 30 μm, although any other coating having an anticorrosive effect can be used.

The coating may be formed on the permanent magnet 14 at any timing, for example, before or after the magnetic material layer 14a is provided on the permanent magnet 14.

Although a few embodiments have been shown and described, it would be appreciated by those skilled in the art that changes may be made in these embodiments without departing from the principles and spirit of the invention, the scope of which is defined in the claims and their equivalents.

For example, although the fluid dynamic bearing is applied to an inner-rotor motor in the embodiments described above, the bearing may also be applied to various other motors, including outer-rotor motors.

What is claimed is:

1. A motor comprising:
    a rotor having a permanent magnet;
    a sleeve rotatably supporting the rotor;
    fluid provided in a gap between the rotor and the sleeve;
    a stator having a electromagnet disposed opposite to the permanent magnet to rotate the rotor relative to the stator; and
    a boss interposed between the sleeve and the stator,
    wherein the sleeve, the stator, and the boss are provided as separate members,
    wherein the inner surface of the boss is fixed to the sleeve, and the outer surface of the boss is fixed to the stator, and
    wherein the stator includes an axially extending portion formed on an inner edge thereof, and the extending portion is fixed to the boss.

2. The motor according to claim 1, wherein the rotor includes a shaft, and wherein two radial pressure-generating regions are formed in an axial direction in a radially opposed region of an inner circumferential surface of the sleeve and an outer circumferential surface of the shaft.

3. The motor according to claim 1, wherein the uppermost surface of the extending portion is lower than the uppermost surface of the boss.

4. The motor according to claim 1, wherein the stator is formed of a magnetic material.

5. The motor according to claim 4, wherein a magnetic material layer is disposed on the surface of the permanent magnet opposite to the stator.

6. The motor according to claim 1, wherein a groove is provided in the outer surface of the sleeve and formed by C-beveling the corner of a butting portion of the sleeve.

7. The motor according to claim 1, wherein the rotor includes a shaft and a circular plate extending radially outward from the shaft,
   wherein the sleeve includes a cylinder rotatably supporting the shaft and a flange-shaped portion extending radially outward from the cylinder,
   wherein a stopper is engaged with the circular plate such that the flange-shaped portion is held between the circular plate and the stopper,
   wherein at least part of the outer surface of the cylinder forms a cylinder seal surface and at least part of the inner surface of the stopper forms a stopper seal surface, and
   wherein the cylinder seal surface and the stopper seal surface form a tapered section, and a fluid-air interface is formed in the tapered section.

8. The motor according to claim 7, wherein the fluid-air interface is formed above the boss.

9. The motor according to claim 7, wherein the boss includes a step accommodating at least part of the stopper.

10. The motor according to claim 7, wherein the stopper seal surface is longer than the cylinder seal surface.

11. The motor according to claim 7, wherein a bottom plate closes the bottom end of the cylinder, and
   wherein the lowermost surface of the bottom plate is higher than the lowermost surface of the boss.

* * * * *

UNITED STATES PATENT AND TRADEMARK OFFICE
CERTIFICATE OF CORRECTION

| | | |
|---|---|---|
| PATENT NO. | : 8,777,488 B2 | Page 1 of 1 |
| APPLICATION NO. | : 13/614360 | |
| DATED | : July 15, 2014 | |
| INVENTOR(S) | : Hiromitsu Gotoh et al. | |

It is certified that error appears in the above-identified patent and that said Letters Patent is hereby corrected as shown below:

On the Title Page Item [30], Line 1, Delete "Nov. 6, 2004" and insert -- Jun. 11, 2004 --, therefor.

Signed and Sealed this
Twenty-eighth Day of October, 2014

Michelle K. Lee
*Deputy Director of the United States Patent and Trademark Office*